United States Patent [19]

Bruckner et al.

[11] Patent Number: 5,562,763
[45] Date of Patent: Oct. 8, 1996

[54] PROCESS FOR THE PREPARATION OF COMPOSITE PIGMENTS

[75] Inventors: Hans-Dieter Bruckner; Ines Subrod, both of Darmstadt, Germany

[73] Assignee: Merck Patent Gesellschaft mit beschrankter Haftung, Darmstadt, Germany

[21] Appl. No.: 43,912

[22] Filed: Apr. 7, 1993

[30] Foreign Application Priority Data

Apr. 7, 1992 [DE] Germany .................. 42 11 560.4

[51] Int. Cl.⁶ .................................................. C09C 1/62
[52] U.S. Cl. .................. 106/403; 106/415; 106/417; 106/493; 106/494
[58] Field of Search .................. 106/403, 417, 106/415, 493, 494

[56] References Cited

U.S. PATENT DOCUMENTS

| | | | |
|---|---|---|---|
| 4,344,987 | 8/1982 | Ostertag et al. | 106/418 |
| 4,435,220 | 3/1984 | Watanabe et al. | 106/417 |
| 4,741,780 | 5/1988 | Atkinson | 106/413 |
| 4,772,331 | 9/1988 | Noguchi et al. | 106/416 |
| 4,909,852 | 3/1990 | Atkinson | 106/493 |
| 5,061,317 | 10/1991 | Korpi et al. | 106/417 |
| 5,078,793 | 1/1992 | Caton | 106/416 |
| 5,165,915 | 11/1992 | Tokubo et al. | 424/63 |

FOREIGN PATENT DOCUMENTS 2657354  7/1991  France .

*Primary Examiner*—Karl Group
*Assistant Examiner*—Scott L. Hertzog
*Attorney, Agent, or Firm*—Millen, White, Zelane & Branigan, P.C.

[57] ABSTRACT

The invention relates to a process for the preparation of composite pigments containing a substrate having an average diameter of 3–200 µm as support for small organic or inorganic pigment particles having an average diameter of less than 1 µm, characterized in that the pigment particles are applied by spray-drying an aqueous suspension containing the substrates and the pigment particles without addition of additives.

14 Claims, No Drawings

PROCESS FOR THE PREPARATION OF COMPOSITE PIGMENTS

BACKGROUND OF THE INVENTION

The invention relates to a process for the preparation of composite pigments containing a substrate having an average diameter of 3–200 μm as support for small organic or inorganic pigment particles having a diameter of less than 1 μm.

Conventional organic or inorganic colored pigment particles are typically absorption pigments which absorb a portion of the incident light and reflect the remaining light in a substantially diffuse manner, thus producing the complementary color of the absorbed light. Pigment particles of this type in general have a rough, irregular surface and are opaque to a greater or lesser extent. The optical properties are affected by the average size of the pigment particles, as a result of which the color purity and color strength in general increases with decreasing average particle size. Pigment particles having an average diameter of less than 1 μm have particularly favorable optical properties.

On the other hand, ultrafine pigment particles of this type are distinguished by poor dispersibility which increases with decreasing particle size.

U.S. Pat. No. 4,435,220 and *Cosmetics and Toiletries*, 104 (1987) 57 have proposed to apply the ultrafine pigment particles to fairly large substrates, in particular platelet-like substrates. This results in a substantial improvement in the dispersibility of the small pigment particles while simultaneously maintaining their excellent optical properties. The pigment particles are applied to the substrates, for example, by a wet chemical method. To this end, an aqueous suspension of the substrates is prepared and the pigment particles are precipitated onto the substrates, and the precipitation conditions (precipitation rate, pH, etc.) are selected such that small pigment particles and no continuous layer are formed (U.S. Pat. No. 4,545,821, EP 0 246,523). However, this process is relatively complicated and requires accurate control of the deposition conditions. Furthermore, defined composite pigments which, in the first layer on the substrate particles, have a relatively high degree of coverage with pigment particles and do not grow in an uncontrolled manner towards the outside are only obtained for relatively low weight proportions of the pigment particles of typically no more than 25% by weight, relative to the weight of the pigment. A further disadvantage is that pigment particles which cannot be precipitated in water cannot be applied using this method.

SUMMARY OF THE INVENTION

Accordingly, an object of the present invention was to provide a simple, low-cost and ideally universally applicable process for the preparation of the composite pigments containing a substrate having an average diameter of about 3–200 μm and supported therein organic or inorganic pigment particles having an average diameter of less than about 1 μm. Further objects of the present invention will be apparent to one skilled in the art from the following detailed description.

It has been found that these objects can be achieved by providing the process according to the invention.

Accordingly, the invention relates to a process for the preparation of pigments containing a substrate having an average diameter of 3–200 μm as support for small organic or inorganic pigment particles having an average diameter of less than 1 μm, characterized in that the pigment particles are applied by spray-drying an aqueous suspension containing the substrates and the pigment particles without addition of additives.

Furthermore, the invention relates to the composite pigments preparable by this process, the pigment particles being pigments which cannot be precipitated in an aqueous medium.

Furthermore, the invention relates to the composite pigments preparable by this process, in which the weight proportion of the pigment particles, relative to the weight of the composite pigment, is preferably more than 30% and in which the composite pigment has substantially the same geometrical structure as the substrate.

FR 2,657,354 has proposed a composite pigment obtained by spray-drying an aqueous suspension comprising feldspar support particles and ultrafine $TiO_2$ pigment particles, in which ammonium polycarboxylate and silicone oil are added as additives. The weight ratio of feldspar to $TiO_2$ is in one example 70:30, and the average diameter of the feldspar and $TiO_2$ particles used are stated to be 3.20 μm and 0.48 μm, respectively, while the composite particles obtained by this process have an average diameter of 16.15 μm. The procedure of the process described in FR 2,657,354 thus results in an increase in the average size of the composite pigment compared with the average size of the substrate many times over and simultaneously a change in the geometrical structure: while the feldspar substrate has a platelet-like structure, the composite pigment obtained is distinguished by a more or less three-dimensional uniform expansion.

However, the large expansion of the pigment dimensions and the resulting change in shape is in many cases undesirable. Thus, in many applications, for example in cosmetics, composite pigments having a platelet-like structure are of interest, since pigments of this type can be readily applied to the skin at a high degree of coverage. In the case of the pigments described in FR 2,657,354, the substrate is completely covered up by the voluminous coating, and the composite pigment overall acts like a $TiO_2$ pigment. However, it is often of interest to achieve only a relatively low degree of coverage of the pigment particles on the substrate, so that the properties of the composite pigment result from superposition of the properties of pigment particles and substrate.

The use of additives in the preparation of composite pigments by means of spray-drying described in FR 2,657,354 has the effect that the composite pigments are very much larger than the substrate particles and moreover differ from them in their geometry. The process described in FR 2,657,354 thus impairs the properties of the composite pigments obtained and is moreover awkward; in addition, the addition of additives deteriorates the economy of the process.

Extensive studies have now shown that the disadvantages discussed of the process described in FR 2,657,354 can be avoided to the greatest possible extent if the addition of additives to the dispersion to be spray-dried is omitted.

The process according to the invention described in detail below gives composite pigments which are distinguished by the following properties:

high compactness a ratio of the average diameter of the composite pigment to the average diameter of the corresponding substrate at a coverage of, for example, 30% by weight, relative to the weight of the composite pigment, of typically not more than 2 (the % by weight mentioned here are obtained from (weight of the pigment particles used/weight of the composite pigment) × 100)

the coverage of the substrate with pigment particles can be varied within wide limits the geometrical structure of the substrate is substantially retained even at high weight proportions of the pigment particles.

The substrates used in the process according to the invention have an average diameter of 3–200 µm and in particular of between 3–100 µm. Either platelet-like substrates or those having substantially three-dimensional uniform dimensions can be used. The platelet-like substrates used according to the invention, which are preferred, preferably have an aspect ratio, i.e. a ratio of diameter to thickness, of at least 5 and in particular of more than 10.

Either transparent, semitransparent or non-transparent substrates can be used. Examples of preferred transparent or semitransparent substrates are glass platelets or glass particles of different geometry, mica, talc, suitable platelet-like or non-platelet-like polymer particles made, for example, of polyethylene, acrylic, polyamide and the like. Examples of preferred non-transparent substrates are metal particles and in particular metal platelets, furthermore, for example, metal oxide particles of platelet-like or different structure, $SiO_2$ particles and the like. This enumeration is only intended as illustration and does not limit the invention in any way; a large number of further substrates can also be used.

The ultrafine pigment particles typically have a three-dimensional uniform structure, in which the average diameter is less than 1 µm. Particular preference is given to pigment particles having an average diameter of less than 0.8 µm and in particular of not more than 0.5 µm. For the preparation of the composite pigments, either only one pigment particle or a mixture of different pigment particles can be used. Composite pigments containing a mixture of at least two pigment particles are easy to prepare, since a uniform mixture in a dispersion, unlike the use of dry powders, is easy to prepare. Mixtures of pigment particles preferably have not more than 5 and in particular up to 3 different pigment particles.

Either inorganic or organic pigment particles can be used, inorganic pigment particles being preferred.

Examples of preferred inorganic white pigment particles are barium sulfate, titanium dioxide, aluminum silicate or zinc white. The following inorganic colored pigment particles may be mentioned in particular: chrome yellow, iron oxide yellow, nickel-titanium yellow, molybdate orange, iron oxide red, ultramarine red, manganese violet, cobalt blue, iron blue, ultramarine blue, chrome oxide green, cobalt green, iron oxide brown or umber. Further preference is given to inorganic black pigment particles, such as, for example, iron oxide black or pigment carbon black and for special applications fluorescent luminous pigment particles, such as, for example, silver-doped zinc sulfide or phosphorescent pigments such as copper-doped zinc sulfide.

Examples of preferred organic colored pigment particles are anthrapyrimidine yellow, azomethine yellow, diarylide yellow, pyrazolone yellow, dipyrazolone orange, perinone orange, pyranthrone orange, anthanthrone red, perylene red, anthraquinone red, naphthol red, dioxazine violet, indanthrone blue, phthalocyanine blue, triphenylmethane blue, phthalocyanine green or isoindoline brown. An example of a preferred organic black pigment particle is aniline black and an example of a suitable luminous pigment particle is in particular azomethine fluorescent yellow.

The weight proportion of the pigment particles, relative to the weight of the composite pigment, is preferably not less than 2% and in particular not less than 5%. Very high weight proportions of up to 60% and more can also be obtained. Particular preference is given to composite pigments in which the weight proportion of the pigment particles is between 5 and 50%, more preferably not more than 30%.

In a first preferred process variant, the substrates and the pigment particles are dispersed in the desired weight ratio in water or an aqueous medium, preferably in water. The sum of substrate and pigment particle concentrations selected should not be too high so as to avoid agglomeration of the composite particles during spray-drying, and can be adjusted according to conventional protocols known to one of ordinary skill in the spray-drying art. It has been found that the sum of substrate and pigment particle concentrations, relative to the weight of the aqueous medium, is preferably not greater than 20% and in particular preferably less than 10%.

The dispersion is then homogenized, preferably using a high-speed mixer, whose stirring rate is preferably not less than about 100 rpm.

The homogenized dispersion is then spray-dried, the inlet temperature at the spray nozzle being typically between 130° and 200° C. and in particular between 150°–170° C. Commercially available apparatuses can be used, such as, for example, the spray-drying unit IRA Mini Spray HO from Labora (nozzle opening 0.5 mm, spray pressure 3 bar); the dispersion is pressed through the nozzle in this apparatus typically at a rate of 2–12 ml/min and in particular about 4–8 ml/min.

The composite pigments obtained only show a very low degree of agglomeration and need not be milled. When viewed under an electron microscope, the pigment particles are found to be relatively densely packed on the substrate surface or, in the case of higher concentrations of the pigment particles, on the pigment particle layer or layers underneath. The pigment particle layers grow relatively uniformly, and even in the case of higher pigment particle concentrations the geometrical form of the composite pigment substantially corresponds to that of the substrate underneath. The ratio of the average diameter of the composite pigment to the average diameter of the corresponding substrate is, at a coverage of, for example, 30% by weight, relative to the weight of the composite pigment, typically not more than 2.

The composite pigments show good dispersing behavior. Depending on the extent of coverage, the optical properties are those of the free pigment particles or a combination of the optical properties of the substrate and pigment particles.

Thus, when mica or platelet-like glass substrates with low pigment particle concentrations of typically less than 20% are used, composite pigments are obtained which have high transparency and the color of the pigment particles (so-called transparent colors).

Very high pigment particle concentrations of typically more than 50% give composite pigments of high covering power whose optical properties are substantially those of the pigment particles.

The optical properties of the composite pigments according to the invention are affected by the geometrical form of the substrates and their optical properties and the size, concentration and the optical properties of the pigment particles.

On the basis of this description, one skilled in the art can, without any inventive step, easily find various composite pigments whose optical properties vary within relatively narrow limits.

In another, likewise preferred variant of the process according to the invention, the pigment particles are produced in an aqueous dispersion of the substrate particles by precipitation. Thus, for example, metal oxide pigments can be produced by hydrolysis of metal halides at a suitable pH, the pH being preferably kept constant by simultaneous addition of a base, for example according to the following equation:

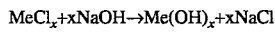

$$MeCl_x + xNaOH \rightarrow Me(OH)_x + xNaCl$$

The rate of addition of metal salt and base selected must not be too small, in order to avoid the formation of a compact metal hydroxide or oxide layer; rather, the rate of addition must be controlled in such a manner that secondary precipitations take place in the solution. An advantage of this process is that homogenization is in general not required, enabling the dispersion to be spray-dried directly after completion of precipitation. In order to remove the salt formed (NaCl), which has been precipitated on the composite pigments, the spray-dried composite pigment is redispersed in water, washed several times and again spray-dried. Alternatively, the salt formed can also be removed before spray-drying by filtering off the reaction product and washing it, followed by redispersion.

The composite pigments obtained by this process variant are likewise distinguished by very advantageous properties and substantially have the same geometry and the same optical properties as the pigments obtained by the other process variant. However, the pigment particles in the composite pigments obtained by the second process variant often form even more compact layers, so that the second process variant is particularly preferred.

In a third, likewise preferred, process variant, the pigment particles are produced as in the second process variant by precipitation, preferably in an aqueous medium, in which, however, unlike the second process variant, no substrate particles are present. Precipitation of the pigment particles is preferably carried out under the conditions described in the second process variant. After precipitation is complete, the substrate particles are added, the dispersion is homogenised and spray-dried. The salt formed can be separated off before or after addition of the substrate particles, as is described in the second process variant.

By using the first process variant, it is also possible to obtain composite pigments containing pigment particles which cannot be precipitated, such as, for example, ultramarine blue; composite pigments of this type are particularly preferred.

Both process variants make it possible to obtain composite pigments having a high weight proportion of pigment particles; composite pigments in which this weight proportion is more than 40% are particularly preferred.

The pigments according to the invention are distinguished by good dispersibility and advantageous optical properties and can be used, for example, for the pigmenting of plastics, paints, printing inks and cosmetics.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application German P 42 11 560.4, filed Apr. 7, 1992, are hereby incorporated by reference.

EXAMPLES

Example 1

20 g of iron blue having an average particle size of less than 1 μm and 20 g of mica (1–15 μm, average particle size 6.5 μm) are dispersed in 1000 ml of fully deionized water and homogenized for 5 minutes using a high-speed stirrer (for example Ultra-Turrax T 50 from Janke & Kunkel) at 3000 rpm.

The dispersion is spray-dried in an IRA Mini Spray HO spray-drying unit from Labora at an inlet temperature of 150° C. and a rate of discharge of 6 ml/min.

The pulverulent composite pigment obtained has an average particle size of 6.5 μm, has a deep blue colo and is transparent. It is distinguished by good dispersibility; milling or air classifying or other separation processes are not required.

Example 2

20 g of mica (1–15 μm, average particle size 6.5 μm) are dispersed in 500ml of fully deionized water. The dispersion is then heated to 75° C., and the pH is brought to 4. 270 ml of an aqueous solution of $FeCl_3$ (150 g of $FeCl_3$/l) are metered in at a rate of 5 ml/min, during which the pH is kept constant by simultaneous addition of a 25% aqueous NaOH solution. The mixture is then stirred at a stirring rate of 500 rpm for 30 minutes. The dispersion is then spray-dried in an IRA Mini Spray HO spray-drying unit from Labora at an inlet temperature of 170° C. and a rate of discharge of 8 ml/min.

The powder obtained is redispersed in fully deionized water; after a sufficient residence time of about ½ hour, the aqueous supernatant is decanted several times in order to remove the by-product NaCl.

The purified dispersion is then again dried under the abovementioned conditions.

The pulverulent composite pigment obtained has an average particle size of about 6.5 μm, is light red and is transparent. It is distinguished by good dispersibility; milling or air classifying or other separation processes are not required.

Example 3

200 ml of $H_2O$ are heated to 75° C. and brought to a pH of 7.5 with dilute NaOH. A nitrogen stream is passed through the solution during the following reaction at a rate of 3.5 l/h. An aqueous solution of 47.5 g of $FeSO_4 \times 7H_2O$, 2.1 g of $KNO_3$ and 0.2 ml of $H_2SO_4$ (96%) in a total volume of 150 ml is added at a rate of addition of 80 ml/h with stirring (500 rpm). The pH is kept constant by addition of dilute NaOH. After addition is complete, stirring is continued for another 15 minutes. The $Fe_3O_4$ formed is allowed to settle, the supernatant solution is decanted and 1000 ml of fully deionized water are added with stirring. This step is repeated twice in order to completely remove the salts formed. 10 g of talc (average particle size 5 μm) are then added, and the mixture is made up to a total volume of 1000 ml with water. The suspension is spray-dried in an IRA Mini Spray HO spray-drying unit from Labora (nozzle opening 0.5 mm, spray pressure 3 bar) at an inlet temperature of 150° C. and a rate of discharge of 6 ml/min. This gives a deep black, transparent, pulverulent composite pigment having an average particle size of 5 μm. It is distinguished by good dispersibility; milling or air classifying or other separation processes are not required.

Ignition of the pigment thus obtained at 800° C. for 30 minutes gives a deep blue-red, transparent composite pigment powder, which likewise is easily dispersible without any additional processing steps.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of a composite pigment containing a substrate having an average diameter of about 3–200 μm and supported thereon organic or inorganic pigment particles having an average diameter of less than about 1 μm, said process comprising spray-drying an aqueous suspension consisting essentially of discrete particles of the substrate and the pigment particles in the absence of wetting, dispersing or deflocculating agents.

2. A process according to claim 1, comprising spray drying the aqueous suspension in the absence of polycarboxylate, silane or silicone oil additives.

3. A process according to claim 1, comprising spray drying the aqueous suspension in the absence of additives.

4. A process according to claim 1, wherein the substrate is a platelet-shaped substrate having an average diameter of between 3 and 200 μm and an aspect ratio of at least 5.

5. A process according to claim 4, wherein the platelet-shaped substrate is mica, talc, glass platelets, platelet-shaped polymer particles, metal platelets or platelet-shaped metal oxides.

6. A process according to claim 1, wherein the pigment particles are pigments which cannot be precipitated in an aqueous medium.

7. A composite pigment obtained by a process according to claim 1.

8. A composite pigment according to claim 7, wherein the pigment particles cannot be precipitated in an aqueous medium.

9. A composite pigment obtained by a process according to claim 1, in which the weight proportion of the pigment particles, relative to the weight of the composite pigment, is 5%–50% and in which the composite pigment has substantially the same geometrical structure as the substrate.

10. A composite pigment obtained by a process according to claim 1, in which the weight proportion of the pigment particles, relative to the weight of the composite pigment, is 30%–60% and in which the composite pigment has substantially the same geometrical structure as the substrate.

11. A pigment according to claim 9, wherein the weight proportion of the pigment particles, relative to the weight of the composite pigment, is not more than 30%.

12. A composite pigment consisting essentially of a substrate, having an average diameter of about 3–200 μm and supported thereon on the substrate surface organic or inorganic pigment particles having an average diameter of less than about 1 μm, in which the composite pigment has substantially the same shape as the substrate.

13. A pigment according to claim 12, wherein the weight proportion of the pigment particles, relative to the weight of the composite pigment, is not more than 30%.

14. A pigment according to claim 12, having a ratio of the average diameter of the composite pigment to the average diameter of the corresponding substrate at a coverage of about 30% by weight, relative to the weight of the composite pigment, of not more than 2.

* * * * *